UNITED STATES PATENT OFFICE.

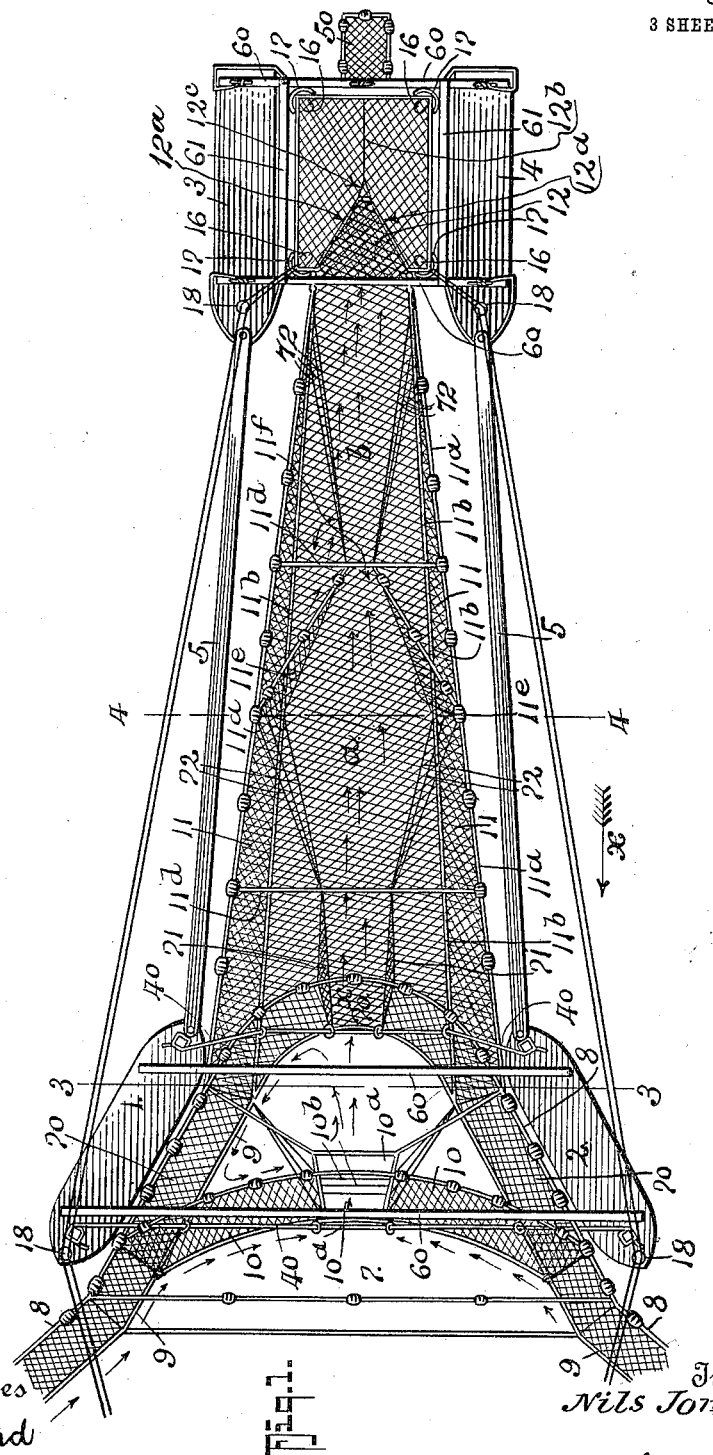

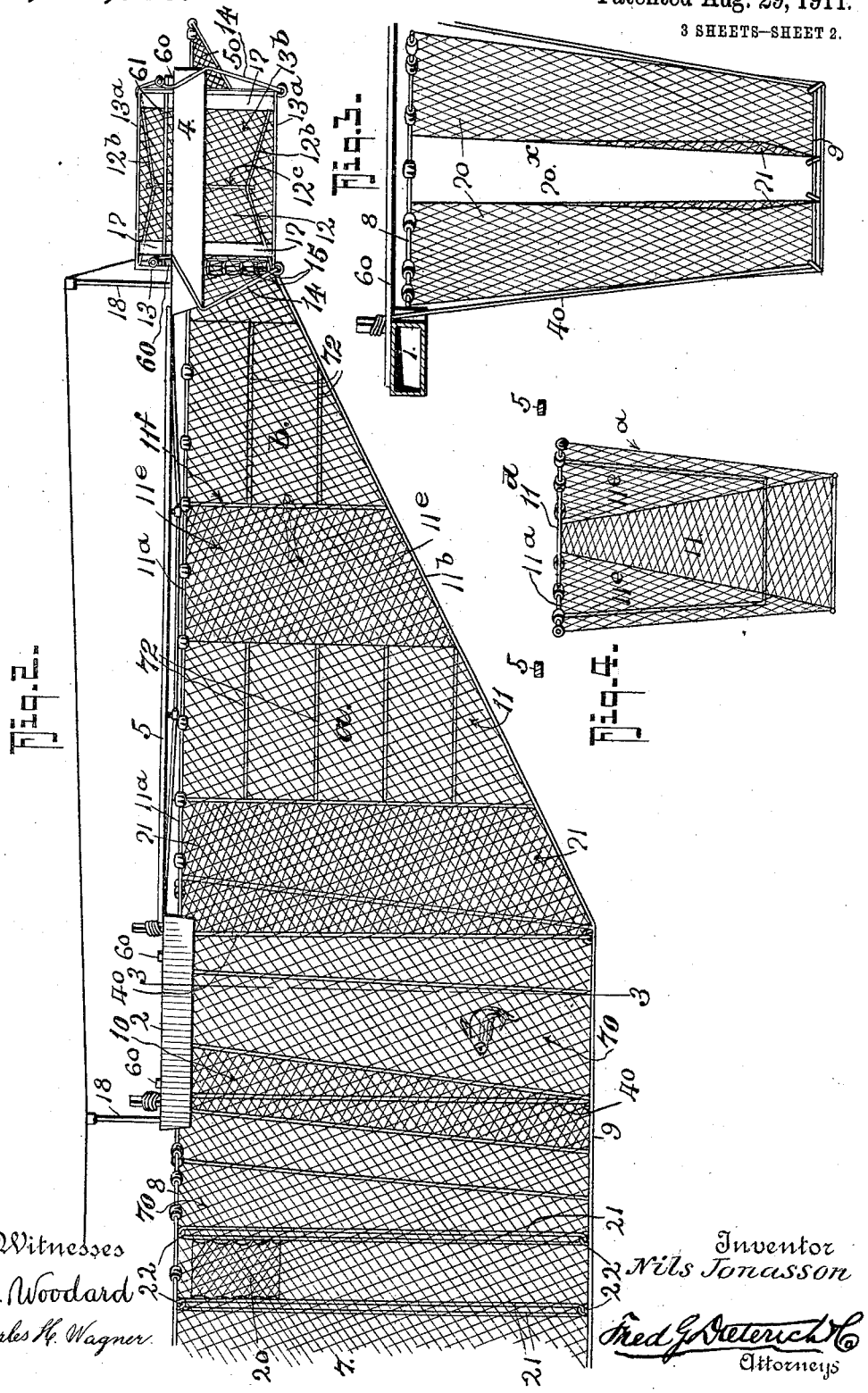

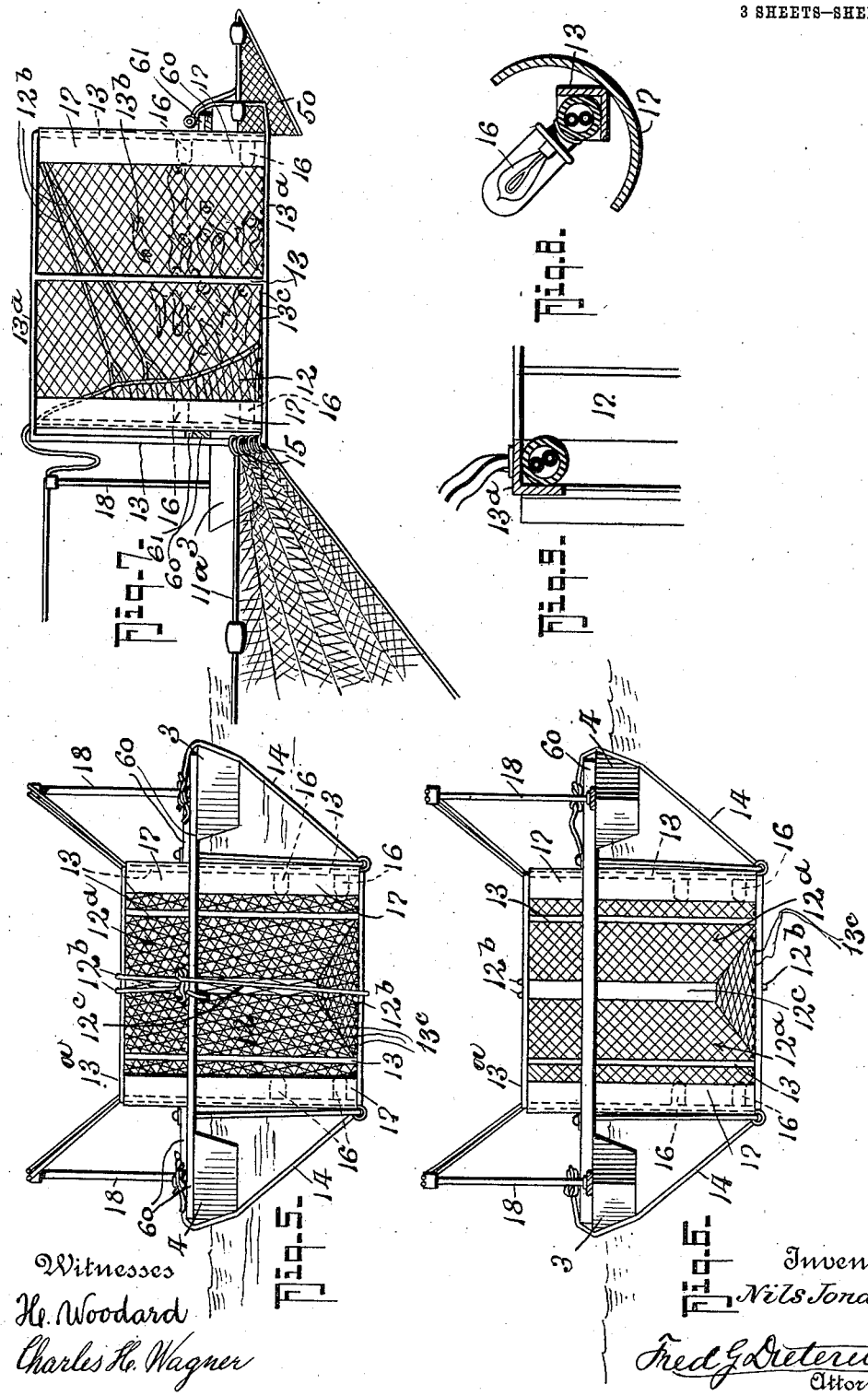

NILS JONASSON, OF COSMOPOLIS, WASHINGTON, ASSIGNOR OF ONE-HALF TO WILLIAM F. McGREGOR, OF ASTORIA, OREGON.

FLOATING FISH-TRAP.

1,001,760.  Specification of Letters Patent.  Patented Aug. 29, 1911.

Application filed March 16, 1911. Serial No. 614,885.

*To all whom it may concern:*

Be it known that I, NILS JONASSON, residing at Cosmopolis, in the county of Chehalis and State of Washington, have invented a new and Improved Floating Fish-Trap, of which the following is a specification.

My invention, which relates to deep water fishing, primarily has for its object to provide a new and improved construction of floating fish trap, more especially designed for salmon fishing and which can be readily set out in either slack ebb or in flood tides.

Another object of my invention is to provide a floating fish trap having special means for easily lifting the trap pot for removing the caught fish and for closing the throatway from the main part of the trap to prevent the escape of fish from said part of the trap when the pot is lifted.

A further object of my invention is to provide a trap of the character stated in which the trap pot is electrically equipped for night fishing and in which a simplified and improved means is embodied for drawing or folding up the entire trap when it is desired to remove the same or shift the setting thereof from one place to another.

With the above and other objects in view, my invention consists of a floating fish trap that embodies the peculiar combinations, and novel arrangement of parts, all of which will be herinafter fully explained, specifically pointed out in the appended claims and illustrated in the accompanying drawings, in which:—

Figure 1, is a plan view that illustrates the general arrangement of my trap, when set. Fig. 2, is a side elevation thereof. Fig. 3, is a cross section of the same, taken substantially on the line 3—3 on Figs. 1 and 2 and more particularly shows how the lift rope hereinafter referred to is arranged. Fig. 4, is a cross section of the trap on the line 4—4 on Fig. 1. Fig. 5, is a rear elevation of the trap pot. Fig. 6, is a front view thereof. Fig. 7, is a detail side elevation and shows the manner in which the trap pot or pound is raised for delivering the caught fish. Figs. 8 and 9 are detail views that show the arrangement of the electric lights and the wiring for the trap pot, and hereinafter more particularly referred to.

In the practical arrangement, my invention comprises a number of connected floats with which the seine portions of the trap are connected and from which the several parts of the seine, including the trap or pound, are controlled, and the said several floats and the seine portions form a floating structure that can be readily towed as a body to the point or points desired, the whole being especially designed for deep water fishing.

The floating structure consists of two front floats 1—2, two rear floats 3—4, which may be, and preferably are, scows or skiffs and the several pairs being arranged in transverse alinement, and to provide for holding the several scows in proper positioned relation, the front and rear pairs of skiffs are joined by long wide planks 5—5 which also form gangs so the fisherman can pass from the front to the rear skiffs. Each pair of skiffs is also braced by cross members 60—60 and the members 60 on the rear skiffs are joined by other cross members 61—61, the said several members 60—61 forming a rectangular framing between which the pot or trap, in which the fish are collected, is vertically movable, as hereinafter explained.

The seine body, the peculiar construction of which forms an essential feature of my invention, includes a main "heart" or entrance portion 7 which comprises the seine wall 70 that connects at the top to the cork lines 8 and at the bottom to the lead line 9 and this part of the trap is the deepest and has the wall inclined slightly inwardly as best shown in Fig. 3, so as to aid in directing the fish upwardly into the tunnel portion of the trap. The "heart" 7 is of uniform depth and at the inner or throat portion it joins with the tunnel portion of the seine, the closed bottom of which inclines upwardly to direct the fish to the pot or trap presently described.

Within the heart 7 and in advance of the throat 70× thereof, is located a blind 10 which has an inwardly curved seine wall, the ends of which join with the opposite sides of the heart and which has the usual cork line connection at the top, and the lead line on the bottom, the object of the said blind 10 being to direct the fish toward the center of the heart before they have the chance to pass to the throat or outlet 70× thereof. Centrally the blind has a passage 10ª that extends its full depth but has a series of cross lines 10ᵇ that form a plurality of horizontal passages for the fish and breaks up a continuous way or opening. By reason of providing a blind in the heart 7 the said heart is divided into two distinct compartments, a wide receiving portion and a restricted one, which, by reason of its restriction, causes the fish as they collect therein to quickly seek an exit from the said heart, it being apparent from Fig. 1 of the drawing, the floating of the trap being in the direction of the arrow $x$, the fish, as they enter the heart take the course indicated by the arrows and in passing through the blind their natural direction of movement is first backwardly toward the blind and thence directly through the throat 70ˣ into the tunnel.

The tunnel is tapering from the heart to the trap or pot and it consists of a main or body portion composed of the inclined sides 11—11 provided with the usual cork and lead lines 11ª—11ᵇ, the latter being braced and held extended by the cross lines 11ᵈ.

At the entrance to the tunnel the throat 70ˣ has rearwardly extended side walls 71 for directing the course of the fish, as indicated by the arrows on Fig. 1, and about midway thereof the passage of the tunnel is restricted by a blind formed by the side walls 11ᵉ—11ᵉ that converge from the sides of the tunnel to a throatway 11ᶠ, the said walls 11ᵉ—11ᵉ and the extensions 71 being held to the desired positions by the stay lines 72—72. The blind walls 11ᵉ—11ᵉ divide the tunnel into two distinct compartments, designated $a$—$b$, and by reason thereof the fish in entering the compartment $a$ collect and pass back from the walls 11ᵉ toward the heart end before they pass through the throatway 11ᶠ into compartment $b$ where their straight course is again intercepted by supplemental tunnel 12 that extends into the trap or pot, the said tunnel 12 consisting of the inwardly converging sides 12ª—12ª braced by the lines 12ᵇ—12ᵇ, the throat 12ᶜ of the said tunnel being of such restricted size as to keep the fish from passing back through it, it being clear from the drawing (see Fig. 1) that the supplemental tunnel 12 causes the fish to change their course and pass back in the main tunnel on the lines indicated before they go through the throat 12ᶜ, it being also clear that by reason of the peculiar construction of the tunnels a large number of fish will at all times be contained within the main tunnel. At the point where the supplemental tunnel joins the main tunnel the latter is of a more flexible character than the main part of the main tunnel, see Figs. 2 and 7, the purpose of which will be presently explained.

The pot or trap, the construction of which forms an important part of my invention, consists of a rectangular framing composed of vertical rods 13—13 top and bottom cross rods 13ª joined with the rods 13 and the sides and bottom seine or netting portions 13ᵇ—13ᶜ the top of the pot being open.

By referring now more particularly to Figs. 5, 6 and 7 of the drawings it will be noticed the pot or trap is located between the framing supported by the rear scows or skiffs and the pot is so supported that when sunk its upper part extends some distance above the water line, high enough that the fish cannot jump over it, and at this point it should be stated, none of the tunnels are covered with netting for the reason that the fish often swim near the top or water surface, especially "sockeye salmon" a species of fish that can see from some distance where they are swimming and are afraid if a net covers the water and throws shadows thereon. The trap 13 is suspended on ropes 14 each of which has one end made fast to the top of the scows and passed over the outside thereof and then down under the cross rods at the bottom of the trap (see Figs. 5 and 6) and then passed up and made fast to the cross members that pass from one scow to the other as is clearly shown and by reason thereof the fishermen in the scows, by pulling up the inner ends of the rope, can readily raise the trap to a point practically out of the water and above the upper side of the tunnel since the latter remains relatively stationary with respect to the trap as will be clearly understood from Fig. 7. Since a large number of the fish are always contained within the main tunnel, I have provided for trapping them in such main tunnel when the pot or trap 13 is elevated by having the outer end of the main tunnel sufficiently flexible that the said end pulls up and closes that end of the main tunnel when the trap is elevated and for such purpose the flexible end of the main tunnel has ring connections 15—15 with the vertical rods of the adjacent end of the trap that collapse when the trap is raised in a manner clearly understood by referring to Fig. 7.

The habit of the salmon at night is to swim toward a light and for night fishing the trap or pot is equipped with electric lights 16—16 located in the corners thereof and to coöperate with U-shaped sheet tin combined guards and reflectors 17, see Figs. 7 and 8, the current wires to the lights passing from the towing boat and over the guide posts 18 on the skiffs.

To provide for quickly hauling up the net, hauling lines 40—40 extend from the front skiffs and connect to the lead lines at the front or heart end of the trap.

20—20 designate canvas drags, one at each side of the front or heart end of the main portion of the seine, and these are secured to pairs of endless cords 21—21 movable through guide eyes 22—22 on the cork and lead lines, the purpose of the said drags being explained as follows. When the floating trap is set for drifting it is placed across the current and only one lead line is used, the other being taken off. If the trap is drifting too fast the other lead line is thrown out from the skiffs and if it does not stop the drifting, the said canvas drags are lowered to form retarding elements.

While I prefer to use the blind net in the front or heart end of the seine, since I find by its use the fish can be the better caught, the said blind net may be omitted when conditions make it so desirable and for readily removing it the said blind is tied to the heart seine by short ropes.

The posts in the rear skiffs that support the electric wires may support tackle for connecting with the trap pot lifting ropes.

50 shows a sack or cod that is detachably secured to the rear wall of the trap or pot which is used when fish are running in large numbers so they can be taken alive from the pot or trap and run into a scow that sets in water, for keeping them alive, when cannery is blocked or the supply is greater than the capacity of the cannery.

From the foregoing, taken in connection with the accompanying drawings, the complete operation the structure and the advantages of my invention will be readily understood by those skilled in the art to which it appertains.

What I claim is:

1. In a floating fish trap, the combination with a pot, and a tunnel whose bottom inclines downwardly from the pot and whose top is relatively stationary with respect to said pot; of a heart seine of uniform depth that extends to the front bottom edge of the tunnel and adjustable retarding elements on the heart end of the trap.

2. A floating fish trap that consists of a pair of front scows, a pair of rear scows, a "heart" portion suspended from the front scows, means on said front scows for lifting up the heart end of the seine, a pot vertically movable between and supported by the rear scows, means on the scows for raising and lowering the pot and a tunnel that joins the heart portion and the pot.

3. In a floating fish trap, the combination with a pot and a tunnel whose bottom inclines downwardly from the pot; and whose top is relatively stationary with respect to the said pot; of a heart seine of uniform depth that extends to the front and bottom edge of the tunnel, adjustable retarding elements on the heart end of the trap and means for simultaneously closing the discharge end of the tunnel as the pot is raised.

4. A floating fish trap that consists of a pair of front scows, a pair of rear scows, a "heart" portion suspended from the front scows, means on the front scows for lifting up the "heart" end of the same, a pot vertically movable between and supported by the rear scows, a tunnel that joins the "heart" portion and the pot, and means on the rear scows for raising and lowering the pot and simultaneously closing the discharge end of the tunnel.

NILS JONASSON.

Witnesses:
CARL KNUTSEN,
W. T. EAKIN.

---

Copies of this patent may be obtained for five cents each, by addressing the "Commissioner of Patents, Washington, D. C."